United States Patent
Yi et al.

(10) Patent No.: US 9,967,828 B2
(45) Date of Patent: May 8, 2018

(54) METHOD AND APPARATUS FOR DECIDING MAXIMUM UPLINK TRANSMISSION POWER IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days. days.

(21) Appl. No.: 15/305,589

(22) PCT Filed: Apr. 24, 2015

(86) PCT No.: PCT/KR2015/004112
§ 371 (c)(1),
(2) Date: Oct. 20, 2016

(87) PCT Pub. No.: WO2015/163730
PCT Pub. Date: Oct. 29, 2015

(65) Prior Publication Data
US 2017/0048803 A1    Feb. 16, 2017

Related U.S. Application Data

(60) Provisional application No. 61/983,461, filed on Apr. 24, 2014.

(51) Int. Cl.
| | | |
|---|---|---|
| *H04W 36/00* | (2009.01) | |
| *H04W 52/14* | (2009.01) | |
| *H04W 52/34* | (2009.01) | |
| *H04W 52/36* | (2009.01) | |
| *H04W 52/28* | (2009.01) | |
| *H04W 52/32* | (2009.01) | |
| *H04W 52/40* | (2009.01) | |

(52) U.S. Cl.
CPC ......... *H04W 52/146* (2013.01); *H04W 52/34* (2013.01); *H04W 52/346* (2013.01);
(Continued)

(58) Field of Classification Search
CPC   H04B 7/18543; H04W 52/228; H04W 52/04; H04W 52/34; H04W 52/146;
(Continued)

(56) References Cited

U.S. PATENT DOCUMENTS

| | | | |
|---|---|---|---|
| 8,743,785 B2 * | 6/2014 | Qu ...................... | H04W 52/244 370/328 |
| 2009/0190510 A1 * | 7/2009 | Kobayashi .......... | H04L 27/2656 370/280 |

(Continued)

FOREIGN PATENT DOCUMENTS

| | | |
|---|---|---|
| WO | WO 2013/069994 A1 | 5/2013 |
| WO | WO 2014/010963 A1 | 1/2014 |

OTHER PUBLICATIONS

Fujitsu, "Physical layer issues of dual connectivity", R1-140192, 3GPP TSG RAN WG1 Meeting #76, Prague, Czech Republic, Feb. 10-14, 2014, 8 pages.

(Continued)

*Primary Examiner* — Dominic Rego
(74) *Attorney, Agent, or Firm* — Birch, Stewart, Kolasch & Birch, LLP

(57) ABSTRACT

A method and apparatus for assigning a power of a master cell group (MCG) and a secondary cell group (SCG) in dual connectivity in a wireless communication system is provided. A user equipment (UE) receives a configuration for a minimum power per CG from a network, and assigns the power per CG based on the received configuration. In this case, at least one of the MCG or the SCG is configured with at least one timing advance (TA).

11 Claims, 11 Drawing Sheets

(52) U.S. Cl.
CPC ........ *H04W 52/367* (2013.01); *H04W 52/281* (2013.01); *H04W 52/325* (2013.01); *H04W 52/40* (2013.01)

(58) Field of Classification Search
CPC ............. H04W 52/281; H04W 52/325; H04W 52/346; H04W 52/367; H04W 52/40
See application file for complete search history.

(56) References Cited

U.S. PATENT DOCUMENTS

| | | | | |
|---|---|---|---|---|
| 2013/0258882 | A1* | 10/2013 | Dinan | ................ H04W 56/001 370/252 |
| 2013/0272233 | A1 | 10/2013 | Dinan | |
| 2014/0044092 | A1* | 2/2014 | Guan | .................... H04L 1/1854 370/330 |
| 2014/0169331 | A1* | 6/2014 | Yang | .................... H04W 52/40 370/331 |
| 2014/0321442 | A1 | 10/2014 | Kim et al. | |
| 2015/0163687 | A1 | 6/2015 | Lee et al. | |
| 2015/0282103 | A1* | 10/2015 | Immonen | ............ H04W 52/346 370/329 |
| 2017/0026920 | A1* | 1/2017 | Dinan | ............... H04W 56/0005 |

OTHER PUBLICATIONS

Fujitsu, "Power allocation strategy for power limited UEs in dual-connectivity", R1-140193, 3GPP TSG RAN WG1 Meeting #76, Prague, Czech Republic, Feb. 10-14, 2014, 8 pages.

* cited by examiner

[Fig. 1]
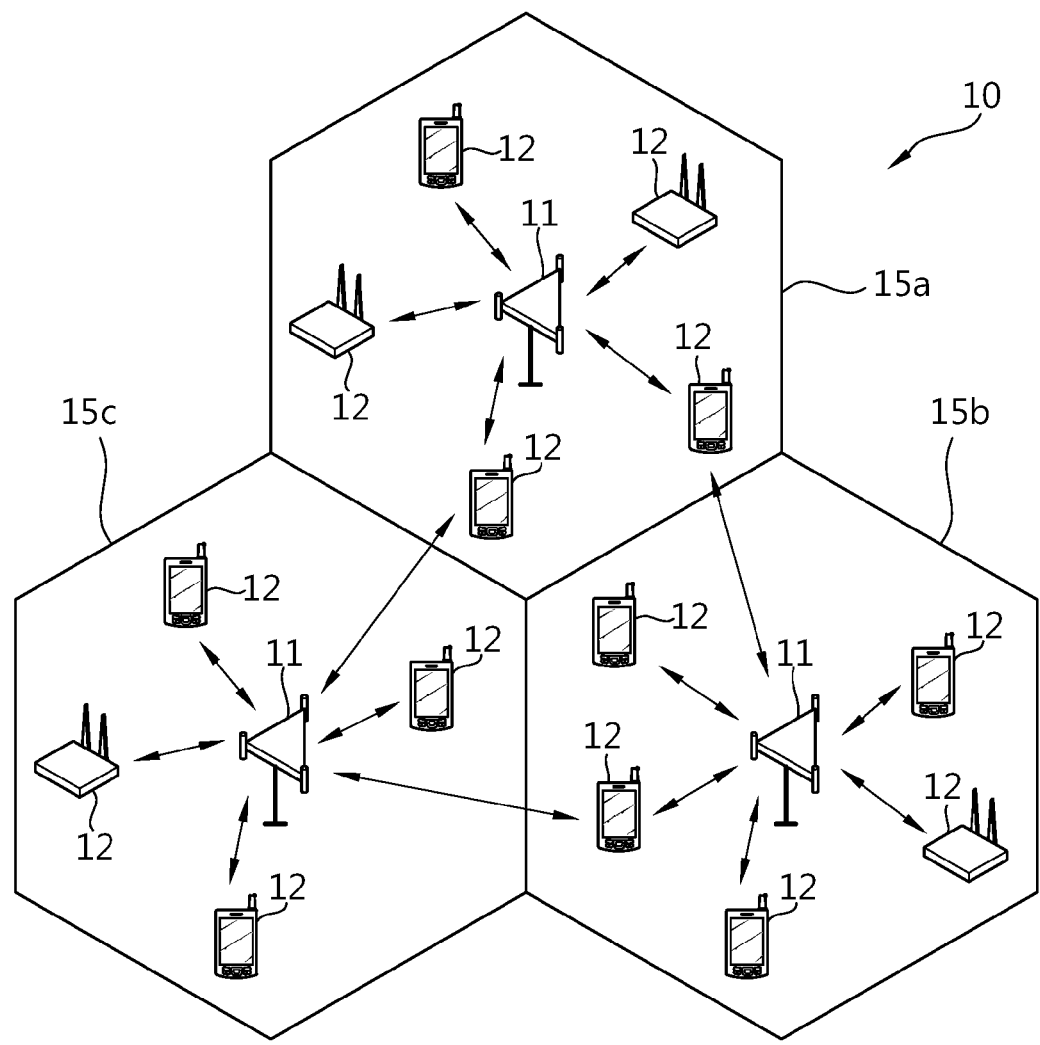
[Fig. 2]
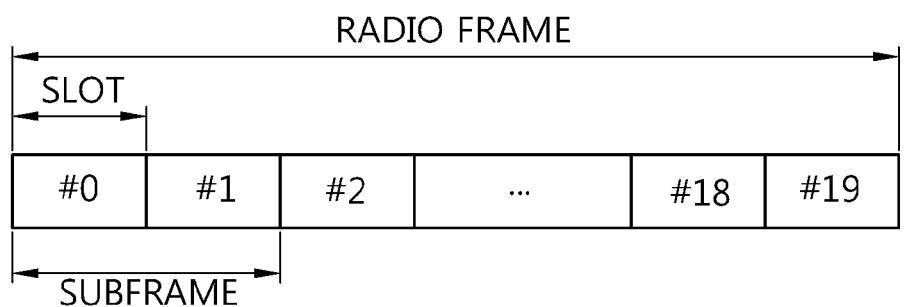

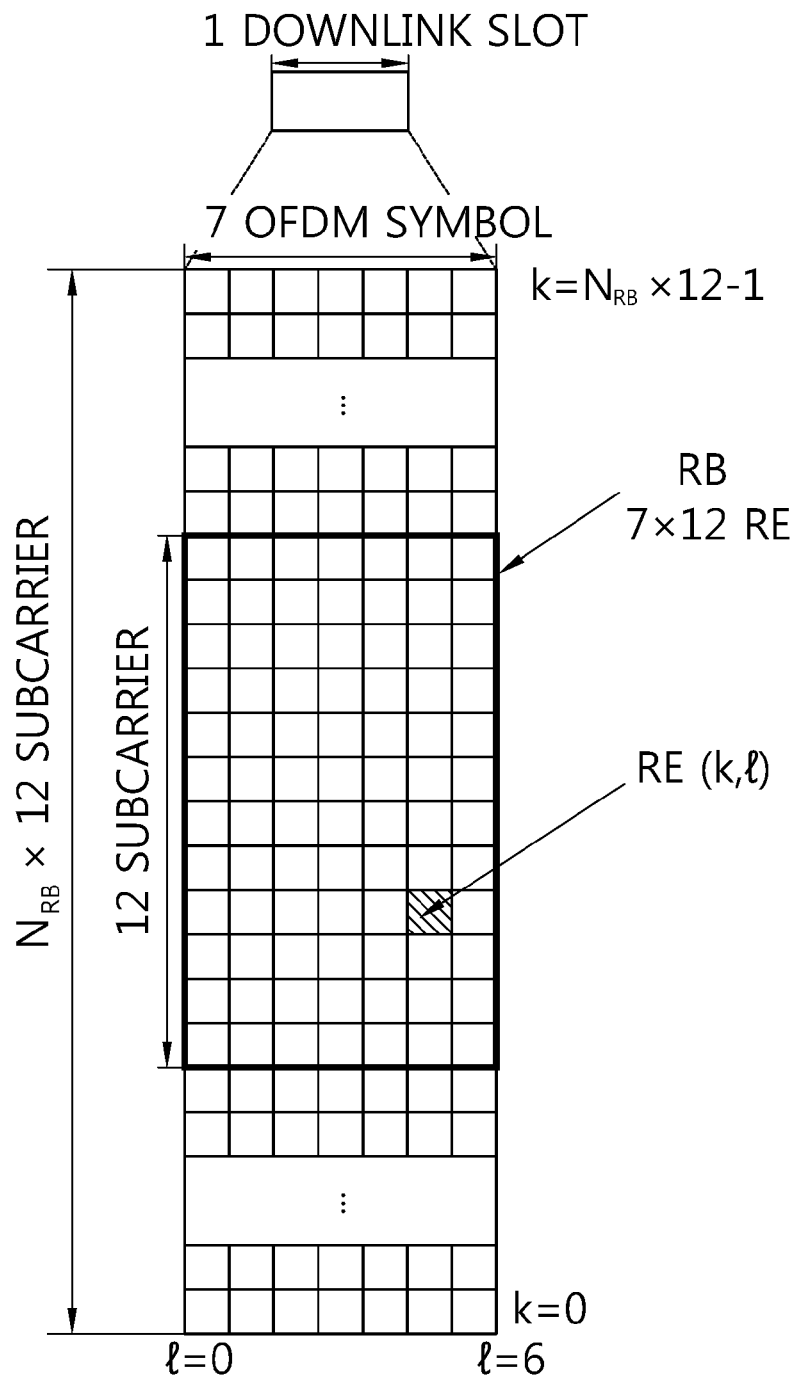
[Fig. 3]

[Fig. 4]
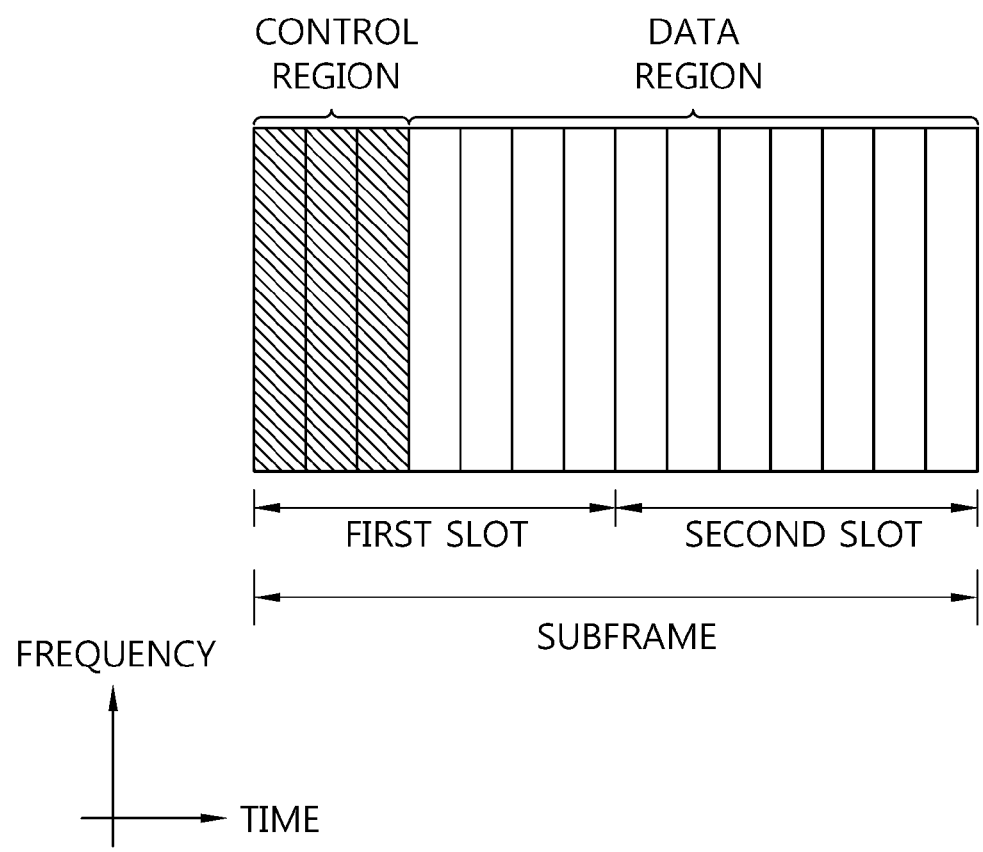

[Fig. 5]
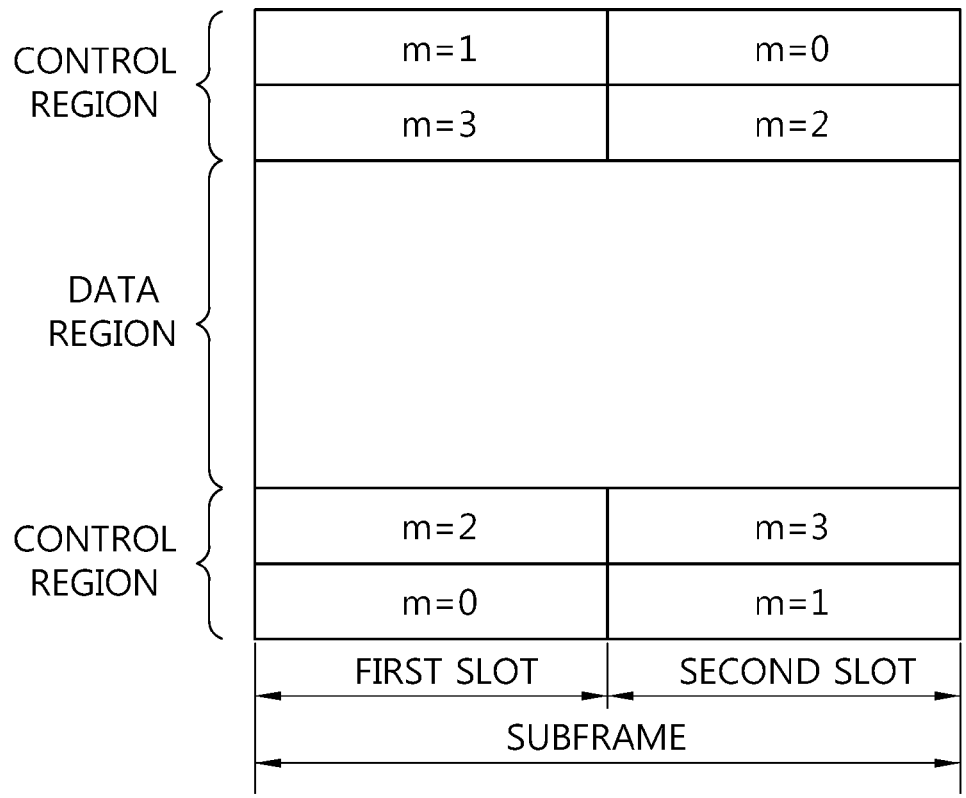
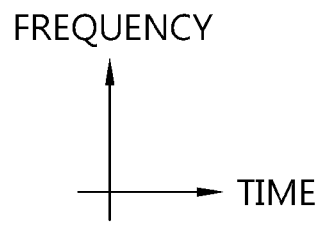

[Fig. 6]
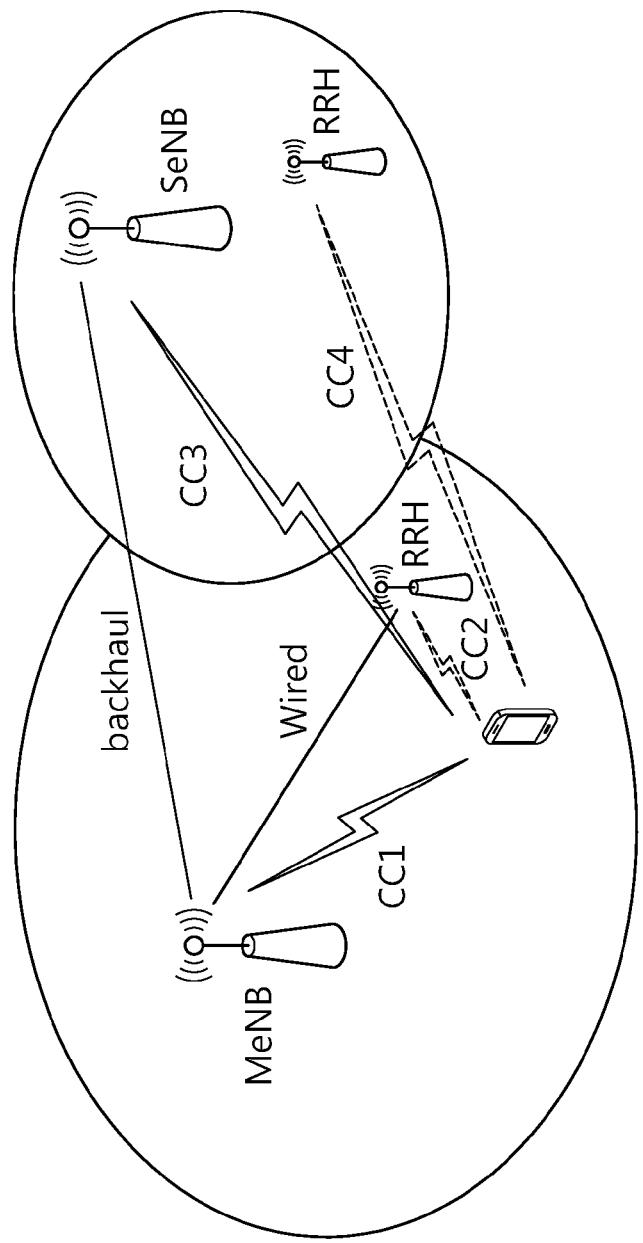

[Fig. 7]
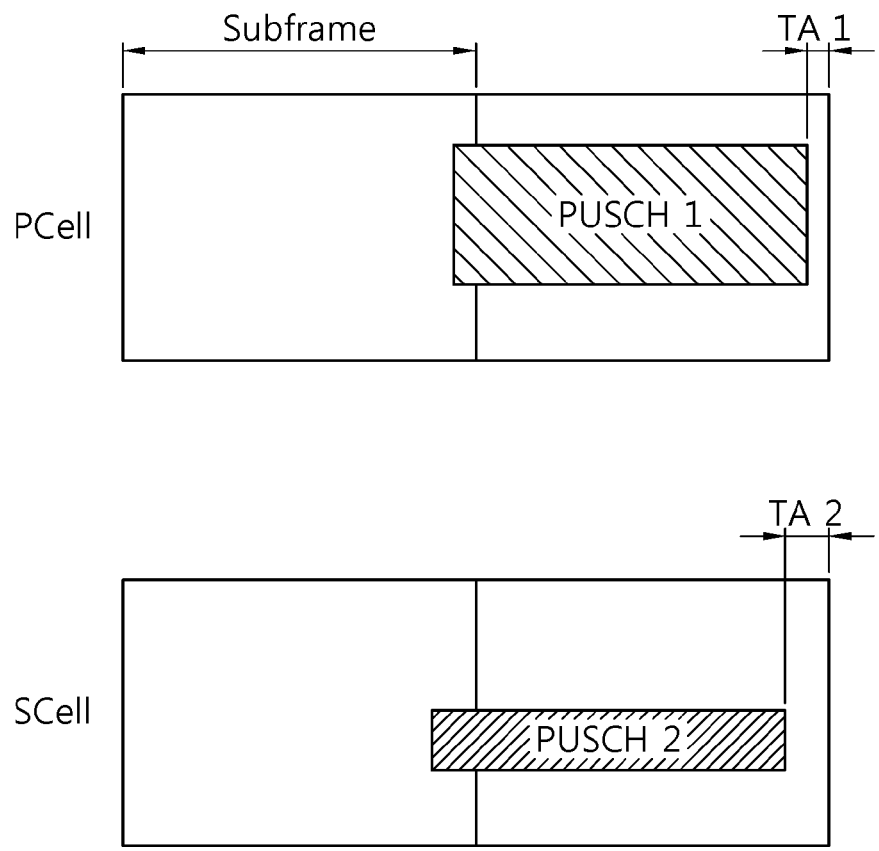

[Fig. 8]
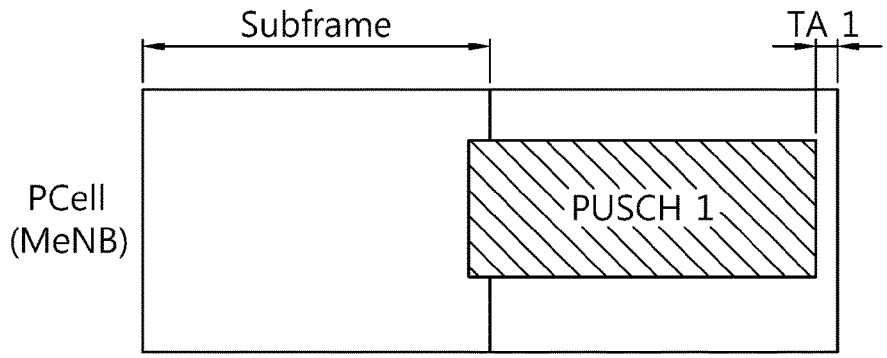
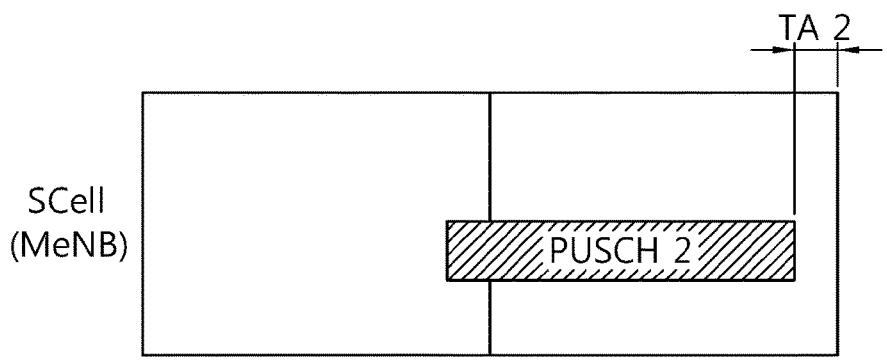
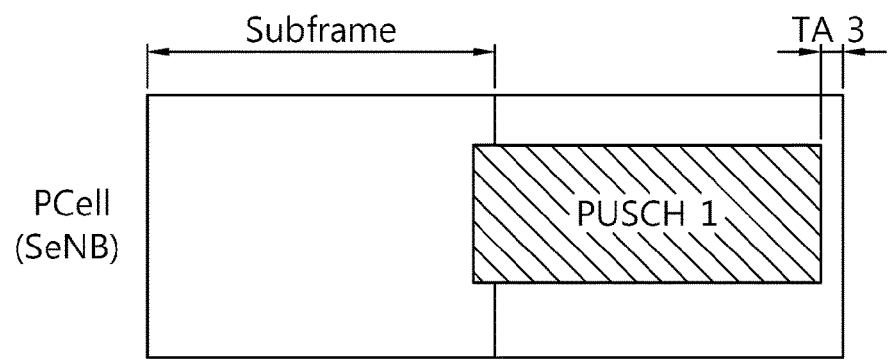
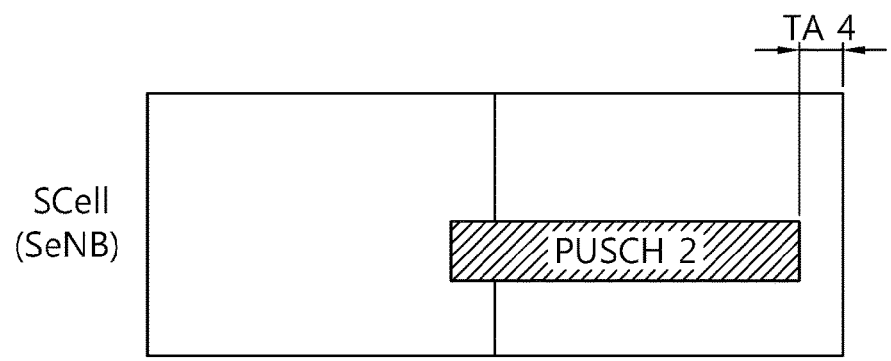

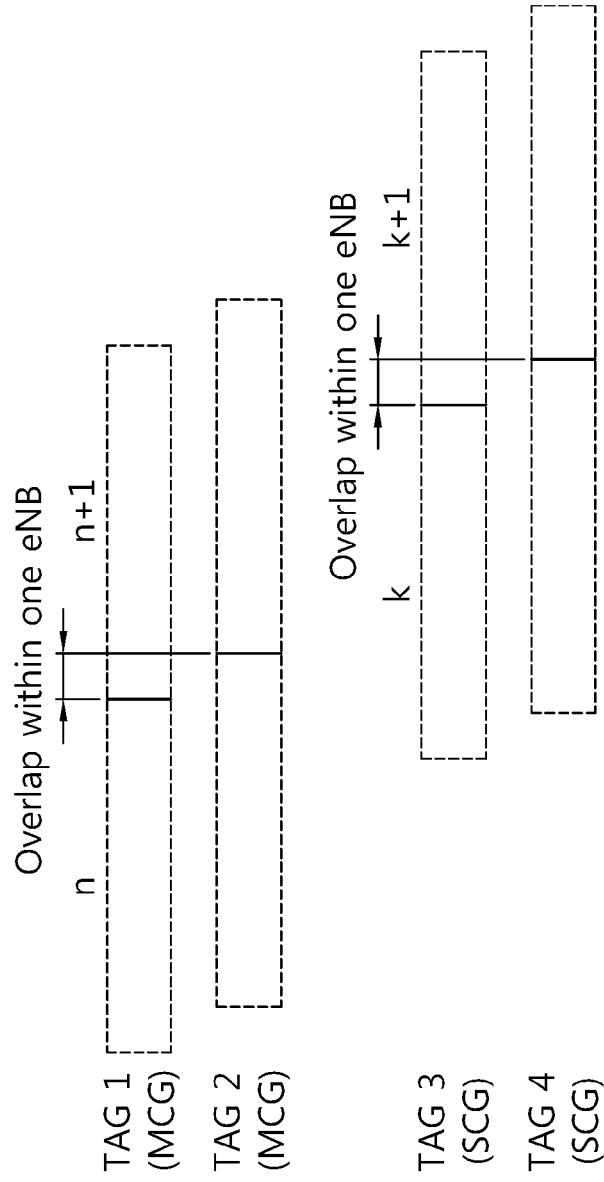
[Fig. 9]

[Fig. 10]
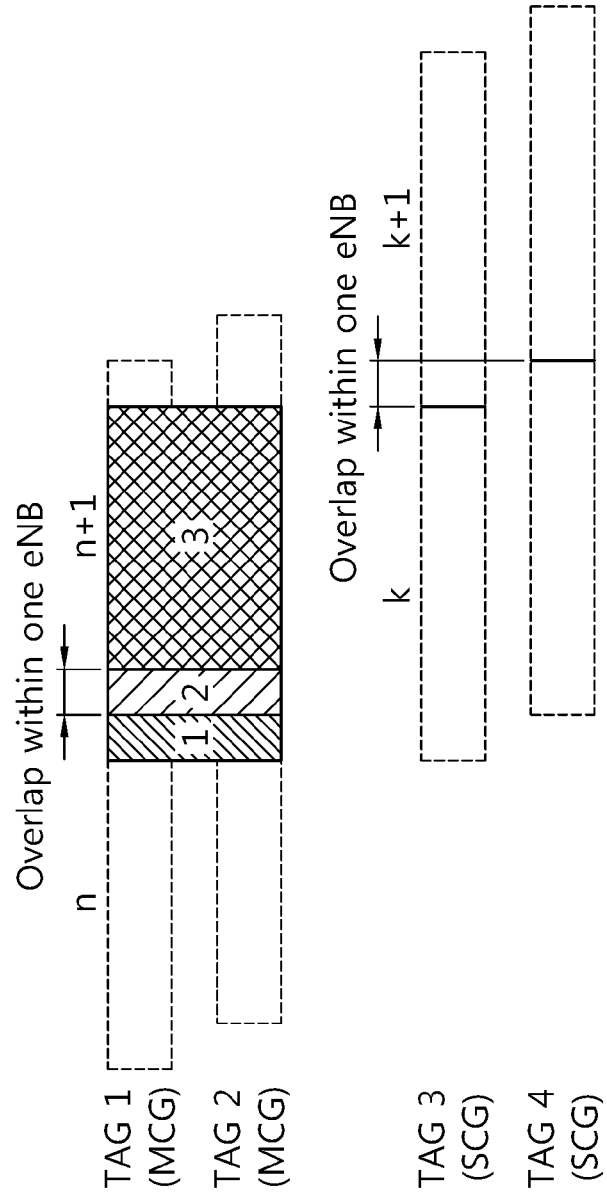

[Fig. 11]
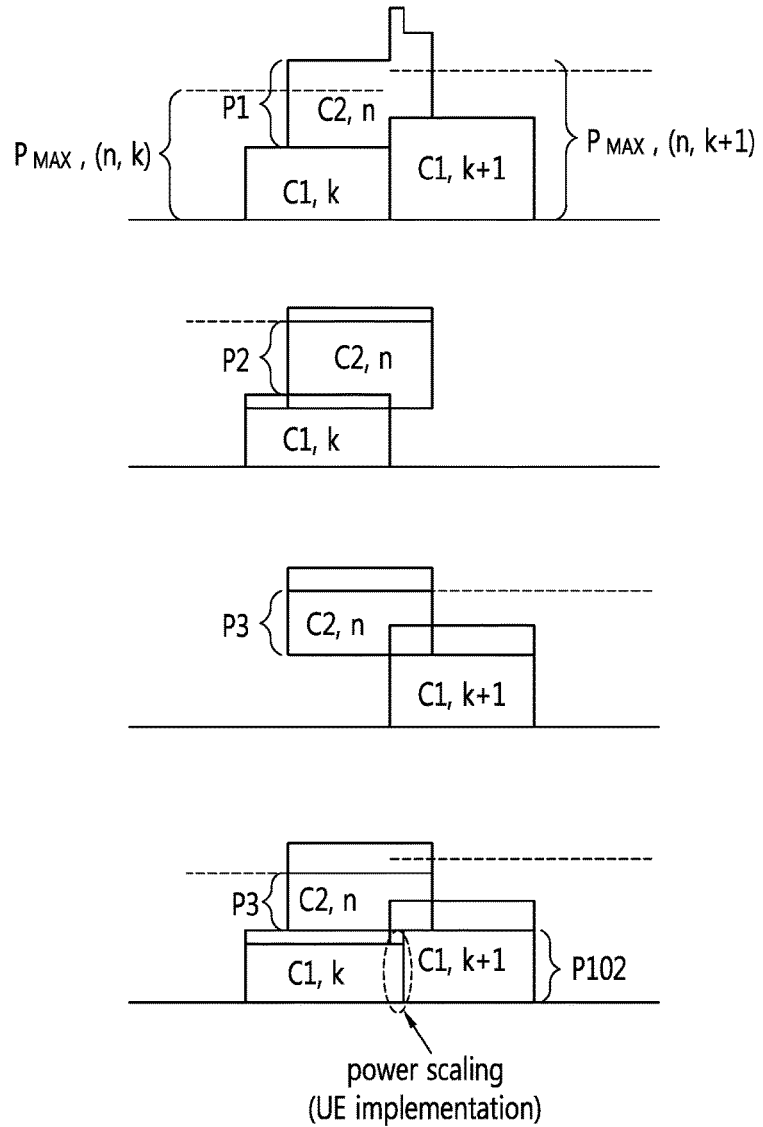
[Fig. 12]
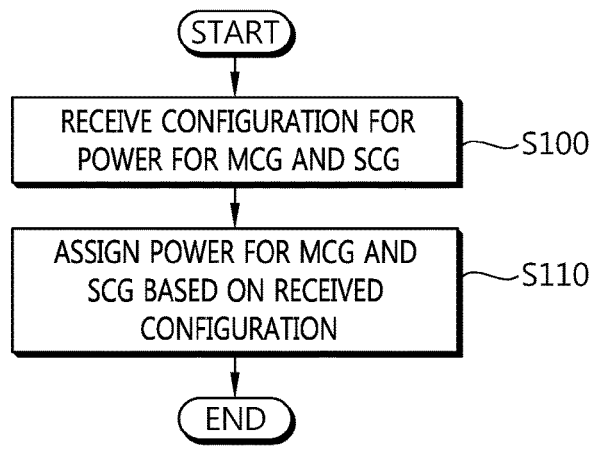

[Fig. 13]
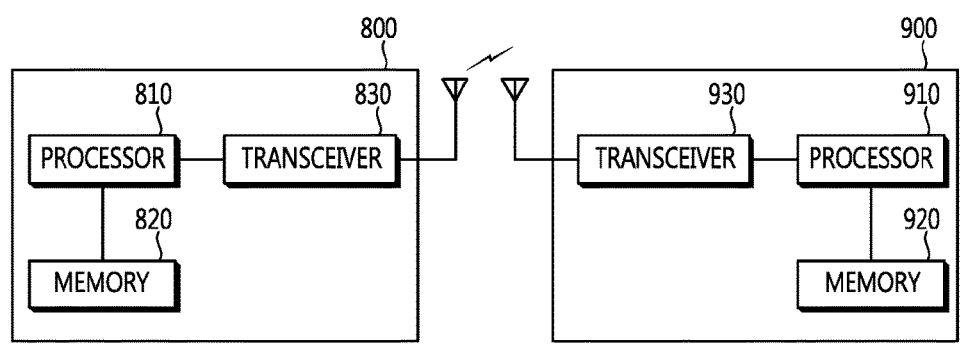

METHOD AND APPARATUS FOR DECIDING MAXIMUM UPLINK TRANSMISSION POWER IN WIRELESS COMMUNICATION SYSTEM

CROSS REFERENCE TO RELATED APPLICATIONS

This application is the National Phase of PCT International Application No. PCT/KR2015/004112, filed on Apr. 24, 2015, which claims priority under 35 U.S.C. 119(e) to U.S. Provisional Application No. 61/983,461, filed on Apr. 24, 2014, all of which are hereby expressly incorporated by reference into the present application.

TECHNICAL FIELD

The present invention relates to wireless communications, and more particularly, to a method and apparatus for deciding a maximum uplink transmission power in a wireless communication system.

BACKGROUND ART

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

One of potential solutions for small cell enhancement, dual connectivity has been discussed. Dual connectivity is used to refer to operation where a given user equipment (UE) consumes radio resources provided by at least two different network points connected with non-ideal backhaul. Furthermore, each eNB involved in dual connectivity for a UE may assume different roles. Those roles do not necessarily depend on the eNB's power class and can vary among UEs.

A method for configuring a maximum uplink transmission power when multiple timing advance (TA) are configured in dual connectivity environment may be required.

DISCLOSURE OF INVENTION

Technical Problem

The present invention provides a method and apparatus for deciding a maximum uplink transmission power in a wireless communication system. The present invention provides a method for configuring a maximum uplink transmission power when multiple timing advance (TA) are introduced in dual connectivity environment.

Solution to Problem

In an aspect, a method for assigning, by a user equipment (UE), a power of a master cell group (MCG) and a secondary cell group (SCG) in dual connectivity in a wireless communication system is provided. The method includes receiving, by the UE, a configuration for a minimum power per CG from a network, and assigning, by the UE, the power per CG based on the received configuration. At least one of the MCG or the SCG is configured with at least one timing advance (TA).

In another aspect, a user equipment (UE) includes a memory, a transceiver, and a processor coupled to the memory and the transceiver, and configured to control the transceiver to receive a configuration for a minimum power per cell group (CG) from a network, and assign the power per CG based on the received configuration. At least one of a master cell group (MCG) or a secondary cell group (SCG) in dual connectivity is configured with at least one timing advance (TA).

Advantageous Effects of Invention

A maximum uplink transmission power can be configured efficiently when multiple timing advance (TA) are introduced in dual connectivity environment.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 shows an example of dual connectivity.
FIG. 7 shows an example of multiple TAs within one eNB.
FIG. 8 shows an example of multiple TAs for MeNB and SeNB in dual connectivity.
FIG. 9 shows an example of partial overlap of a subframe boundary in a cell which belongs to two TAGs.
FIG. 10 shows another example of partial overlap of a subframe boundary in a cell which belongs to two TAGs.
FIG. 11 shows various examples of power scaling according to an embodiment of the present invention.
FIG. 12 shows an example of a method for assigning power per CG according to an embodiment of the present invention.
FIG. 13 shows a wireless communication system to implement an embodiment of the present invention.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

Carrier aggregation (CA) is described. As the increased demands for the high data rate transmission, the mobile communication system composed of aggregated multiple component carriers (CCs) is now being researched. The UE can monitor and receive DL signal/data from multiple DL CCs at the same time. However, even if a cell is managing N DL CCs, the network may configure a UE with M DL CCs where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N.

Moreover, for cross-CC scheduling of LTE-A UEs, the introduction of carrier indicator field (CIF) has been considered. The baseline of PDCCH transmission for LTE-A is summarized as follows, and configuration for the presence or absence of the CIF within PDCCH is semi-statically and UE-specifically enabled by higher layer signaling.

CIF Disabled: PDCCH on a DL CC assigns PDSCH resources on the same DL CC and PUSCH resources on a single linked UL CC. In this case, CIF is not configured, and PDCCH structure (same coding, same CCE-based resource mapping) and DCI formats may be the same as those of LTE rel-8.

CIF Enabled: PDCCH on a DL CC can assign PDSCH or PUSCH resources in one of multiple aggregated DL/UL CCs using the CIF. In this case, DCI formats of LTE Rel-8 are extended with the CIF. The CIF may be a fixed 3-bit field. The location of the CIF may be fixed irrespective of DCI format size. LTE Rel-8 PDCCH structure (same coding, same CCE-based resource mapping) may be reused.

In the case of presence of CIF, desirably, the eNB may assign the PDCCH monitoring DL CC set for reduction of blind decoding complexity at the UE side. This CC set is a portion of the entire aggregated DL CCs and the UE only performs detection/decoding of PDCCHs scheduled for it on this set. In other words, to schedule PDSCH/PUSCH for the UE, the eNB may transmit PDCCHs only through the PDCCH monitoring DL CC set. The PDCCH monitoring DL CC set may be set UE-specific or UE-group-specific or cell-specific. For example, when 3 DL CCs are aggregated, and DL CC A may be configured as the PDCCH monitoring DL CC. If the CIF is disabled, each DL CC can transmit only the PDCCH scheduling its own PDSCH without the CIF, by following the LTE Rel-8 PDCCH principle. On the other hand, if the CIF is enabled by UE-specific higher layer signaling, only DL CC A can transmit the PDCCHs scheduling not only its own PDSCH but also PDSCHs of the other CCs, by using the CIF. No PDCCH is transmitted on DL CC B and DL CC C which are not configured as the PDCCH monitoring DL CC.

Dual connectivity is described. Dual connectivity is an operation where a given UE consumes radio resources provided by at least two different network points (master eNB (MeNB) and secondary eNB (SeNB)) connected with non-ideal backhaul while in RRC_CONNECTED. That is, the UE receives two kind of services by the dual connectivity. One of the services is received from the MeNB directly. The MeNB is an eNB which terminates at least S1-MME and therefore act as mobility anchor towards the core network (CN) in dual connectivity. The other service is received from the SeNB. The SeNB is an eNB which provides additional radio resources for the UE, which is not the MeNB, in dual connectivity. Further, the service may be moved between the macro eNB and SeNB depending on the UE's requirement or load status of the eNBs. A master cell group (MCG) refers the group of the serving cells associated with the MeNB, comprising of the primary cell (PCell) and optionally one or more secondary cells (SCells). A secondary cell group (SCG) refers the group of the serving cells associated with the SeNB, comprising of primary SCell (PSCell) and optionally one or more SCells.

FIG. 6 shows an example of dual connectivity. Referring to FIG. 6, the UE is connected to both the MeNB and SeNB. The UE is connected to the MeNB via CC1. The UE is connected to the SeNB via CC3. The MeNB and SeNB are connected to each other by backhaul. Further, the MeNB manages a RRH which is wired-connected to the MeNB. The UE is connected to the RRH managed by the MeNB via CC2. The SeNB also manages a RRH. The UE is connected to the RRH managed by the SeNB via CC4.

Timing advance (TA) is described. In RRC_CONNECTED, the eNB is responsible for maintaining the timing advance. Serving cells having UL to which the same timing advance applies (typically corresponding to the serving cells hosted by the same receiver) and using the same timing reference cell are grouped in a timing advance group (TAG). Each TAG contains at least one serving cell with configured UL, and the mapping of each serving cell to a TAG is configured by radio resourced control (RRC)

In some cases (e.g. during discontinuous reception (DRX)), the timing advance is not necessarily always maintained and the media access control (MAC) sublayer knows if the L1 is synchronized and which procedure to use to start transmitting in the UL. As long as the L1 is non-synchronized, UL transmission can only take place on physical random access channel (PRACH).

For a TAG, cases where the UL synchronization status moves from "synchronized" to "non-synchronized" include expiration of a timer specific to the TAG and non-synchronized handover.

The synchronization status of the UE follows the synchronization status of the primary TAG (pTAG). When the timer associated with pTAG is not running, the timer associated with a sTAG shall not be running.

The value of the timer associated to the pTAG is either UE specific and managed through dedicated signaling between the UE and the eNB, or cell specific and indicated via broadcast information. In both cases, whenever a new timing advance is given by the eNB for the pTAG, the timer is normally restarted to a UE specific value if any, or to a cell specific value otherwise.

The value of the timer associated to a secondary TAG (sTAG) is managed through dedicated signaling between the UE and the eNB, and the timers associated to different sTAGs can be configured with different values. The timer of a sTAG is normally restarted whenever a new timing advance is given by the eNB for the corresponding sTAG.

Upon DL data arrival or for positioning purpose, a dedicated signature on PRACH can be allocated by the eNB to the UE. When a dedicated signature on PRACH is allocated, the UE shall perform the corresponding random access procedure regardless of its L1 synchronization status.

Timing advance updates are signaled by the eNB to the UE in MAC protocol data units (PDUs).

Upon reception of a timing advance command, the UE shall adjust its UL transmission timing for PUCCH/PUSCH/sounding reference signal (SRS) of the primary cell (PCell). The timing advance command indicates the change of the UL timing relative to the current UL timing as multiples of 16 Ts. The UL transmission timing for PUSCH/SRS of a secondary cell (SCell) is the same as the PCell. For a timing advance command received on subframe n, the corresponding adjustment of the timing shall apply from the beginning of subframe n+6. When the UE's UL PUCCH/PUSCH/SRS transmissions in subframe n and subframe n+1 are overlapped due to the timing adjustment, the UE shall transmit complete subframe n and not transmit the overlapped part of subframe n+1.

As described above, dual connectivity may be considered where the UE can be connected to multiple eNBs. Also, it is feasible that the UE can be configured with multiple carriers in different bands per each eNB. Furthermore, the MeNB and SeNB may not be tightly synchronized so that UL transmission to each eNB may not be aligned in terms of subframe-boundary. Thus, some timing difference, i.e. multiple TAs, may occur.

FIG. 7 shows an example of multiple TAs within one eNB. Referring to FIG. 7, due to different propagation delay for each carrier configured within one eNB, the PCell and SCell have different TAs, i.e. TA 1 for the PCell and TA 2 for the SCell.

FIG. 8 shows an example of multiple TAs for MeNB and SeNB in dual connectivity. Referring to FIG. 8, due to eNB timing, the MeNB and SeNB have different timing. Further, the PCell and SCell have different TAs, i.e. TA 1 for the PCell of the MeNB, TA 2 for the SCell of the MeNB, TA 3 for the PCell of the SeNB, and TA 4 for the SCell of the SeNB.

FIG. 9 shows an example of partial overlap of a subframe boundary in a cell which belongs to two TAGs. When the UE transmits a signal via multiple TAGs and adjacent subframes of different TAGs partially overlaps with each other in time domain, a maximum UL transmission power ($P_{CMAX}$) may need to be determined in overlapped duration. Referring to FIG. 9, in MCG, which refers the group of the serving cells associated with the MeNB and includes the PCell, two TAGs, i.e. TAG1 and TAG2, are configured. Subframe n+1 of TAG1 and subframe n of TAG2 are overlapped. Further, in SCG, which refers the group of the serving cells associated with the SeNB and including the PSCell, two TAGs, i.e. TAG3 and TAG4, are configured. Subframe k+1 of TAG3 and subframe k of TAG4 are overlapped.

Hereinafter, mechanisms to address the UL power control, when multiple TAs are configured, i.e. asynchronous case, within one or both eNBs and dual connectivity is configured, are described according to an embodiment of the present invention. More specifically, a method for controlling maximum UL transmission power in a random access procedure performed via a SCell or SCG, among cells or cell groups which operate with independent UL TA. Hereinafter, it is assumed that independent TA is applied to different cell or different cell group which include multiple cells, respectively. The PCell (or, PCell group) may be one PCell or a cell group to which the same TA is applied and includes one PCell and at least one SCell. The SCell (or, SCell group) may be one SCell or a cell group to which the same TA is applied and includes multiple SCells. For the sake of convenience, a cell group to which the same PA is applied is called a TAG. A TAG including the PCell is called a PCell TAG (pTAG). A TAG not including the PCell is called a SCell TAG (sTAG). One TAG may include at least one cell.

First, a method for determining power allocation at each subframe for each eNB according to an embodiment of the present invention is described. In terms of allocating the power, unless the maximum UL transmission power per eNB is semistatically configured and thus there is no need to look at power for the other eNB, in order to determine the power at subframe k for SCG, the power allocation of MCG at subframe n and subframe n+1 should be considered. When the power allocation of MCG is computed, whether to consider overlapped portion within one eNB or not for determining the power allocation of SCG at subframe k may be decided.

FIG. 10 shows another example of partial overlap of a subframe boundary in a cell which belongs to two TAGs. Referring to FIG. 10, portion 1 corresponds to subframe n for both TAG1 and TAG2. Portion 3 corresponds to subframe n+1 for both TAG1 and TAG2. Portion 2 corresponds to the overlapped portion, i.e. subframe n+1 for TAG1 and subframe n for TAG2. Accordingly, whether to consider portion 2 for determining the power allocation of SCG at subframe k may need to defined.

(1) When determining the power allocation of one eNB, overlapped portion from the other eNB due to multiple TAs may not be considered. This is to avoid the case where power is unnecessarily wasted where some power in those overlapped portion can be temporally reduced. That is, for determining the power allocation of SCG, only portion 1 and 3 described above in FIG. 10 may be considered.

(2) When determining the power allocation of one eNB, overlapped portion from the other eNB due to multiple TAs may be considered. That is, for determining the power allocation of SCG, all portion 1/2/3 described above in FIG. 10 may be considered.

When portion from the other eNB due to multiple TAs is be considered, it is necessary to determine how to handle the case if power at overlapped portion may exceed UE maximum power. For example, power scaling may be performed based on priority between subframe (k, n) and subframe (k, n+1).

More specifically, in power control of dual connectivity, it is expected that minimum power per CG is configured by the network where the minimum power per CG may be guaranteed at least if there is UL transmission per CG. Accordingly, based on the configuration by the network, a UE first may assign power per CG and then apply priority based on uplink control information (UCI) type for the remaining power which has not been claimed for power allocation per CG. Once power allocation based on UCI type per CG is achieved, each CG may be allocated with the total power based on the summation of allocated power per channel for each CG. Using the allocated power, if needed, Rel-11 power scaling may be performed.

Similarly, the same thing may be applied to a case where more than one TAG is configured per CG. For example, if the power has been split to 40%/60% for MCG/SCG respectively where MCG has two TAGs, power in the overlapped portion between subframe n and subframe n+1 may be bounded by 40% of the power restriction such that necessary power scaling per 3GPP Rel-11 may be applied in the overlapped portion not to exceed the allocated power (40% of the UE maximum power). Of course, the allocated power may be an absolute value such as 20 dBm, then the power may not exceed 20 dBm in the overlapped portion between different TA groups.

FIG. 11 shows various examples of power scaling according to an embodiment of the present invention. In first figure of FIG. 11, Pmax (n, k) at subframe n of MCG and subframe k of SCG is configured, and Pmax (n, k+1) at subframe n+1 of MCG and subframe k of SCG is configured. P1 is power at subframe n of MCG before power scaling. In second figure of FIG. 11, considering power P1 at subframe n of MCG, power at subframe k of SCG (C1, k) is determined. P2 is power at subframe n of MCG considering power at subframe k of SCG (C1, k). In third figure of FIG. 11, considering power P1 at subframe n of MCG, power at subframe k+1 of SCG (C1, k+1) is determined. P3 is power at subframe n of MCG considering power at subframe k+1 of SCG (C1, k+1). In fourth figure of FIG. 11, considering power at subframe k of SCG (C1, k) and subframe k+1 of SCG (C1, k+1), power at subframe n of MCG is determined to P3 so as not to exceed UE maximum power. Power at subframe k of SCG (C1, k) and at subframe k+1 of SCG (C1, k+1) are appropriately scaled down. Further, at overlapped portion, power scaling is performed by UE implementation.

In other words, in terms of handling temporary high power at overlapped portion due to multiple TAs, it may be up to the UE implementation how to maintain the power less than UE maximum power at any point. In this case, it may be further assumed that power is not reduced in the middle of transmission and thus power scaling may occur for UL transmissions with multiple TAs. In other words, as described above, power scaling may be performed at (C1, k) and (C1, k+1) in the figure. Alternatively, the UE maximum power may exceed its power class in the overlapped portion due to multiple TAs, and in this case accordingly, power scaling may not be needed. Or, it may not be specified in what behavior the UE should do.

Considering potential issue with multiple TAs, when dual connectivity is configured, more than one TAG may not configured per each eNB when both eNBs are not synchronized each other. In other words, if synchronization between two eNBs cannot be assumed, then only one TAG may be configured per each eNB and thus multiple TAGs functionality within an eNB group is not assumed.

Further, for handling of the synchronous case where the maximum timing difference between two eNBs may not exceed a certain value such as 33 us, the mechanism of the handling synchronous case may follow mechanism of handling asynchronous case described above. In summary, when power is allocated per CG, only the same subframe such as subframe n may be considered for power allocation. Once the power is allocated per CG, handling of very short overlapped portion between two CGs may follow one or some of following options:

(1) The UE may apply multiple TA power scaling rule based on priority rule which is based on UCI type across CG. For example, the power in the overlapped portion (if power-limited) may be reduced not to exceed UE maximum power. When reducing power, the priority among channels based on UCI type across CGs may be used. For example, the priority among channels may be configured as PRACH on MCG>PRACH on SCG>PUCCH on MCG>PUCCH on SCG. For PUSCH, earlier transmission may have higher priority if colliding with PUSCH in the other eNB. Or, even for PUSCH, MCG may have higher priority.

(2) The UE may set higher priority on earlier transmission regardless of UCI type. That is, instead of determining power scaling per UCI type based priority, earlier transmission may have higher priority. Thus, n+1 subframe may reduce the power in the first OFDM symbol not to exceed UE maximum power.

(3) The UE may keep the same power regardless of overlapped portion. That is, the power at subframe n may be retained except for the SRS case. For SRS case, it may be dropped per multiple TA rule. For PUCCH, and PUSCH, subframe n may use the same power regardless of overlapped portion with subframe n+1. If subframe n+1 contains PUCCH, and thus, reducing power at the first symbol may not be desirable, the UE may drop PUCCH transmission at subframe n+1.

(4) The UE may perform equal or weighted power scaling between CGs. In the overlapped portion, equal or weighted power scaling may be used.

FIG. 12 shows an example of a method for assigning power per CG according to an embodiment of the present invention. In step S100, the UE receives a configuration for a minimum power per CG from a network. In step S110, the UE assigns the power per CG based on the received configuration. At least one of the MCG or the SCG is configured with at least one TA. The power of the MCG may be assigned based on the power of SCG, except an overlapped portion of subframes within the SCG. Likewise, the power of the SCG may be assigned based on the power of MCG, except an overlapped portion of subframes within the MCG. The UE may further apply a priority based on a type of UCI for a remaining power which is not assigned per CG. For example, the priority of PRACH may be higher than the priority of PUCCH/PUSCH. Or, the priority of a preceding subframe may be higher than the priority of a following subframe. The UE may further perform power scaling on the assigned power per CG. More than one TAG may be configured per CG.

FIG. 13 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for assigning, by a user equipment (UE), a power of a master cell group (MCG) and a secondary cell group (SCG) in dual connectivity in a wireless communication system, the method comprising:
    receiving, by the UE, a configuration for a power per cell group (CG) from a network; and
    assigning, by the UE, the power per CG based on the received configuration,
    wherein at least one of the MCG or the SCG is configured with at least one timing advance (TA), and
    wherein the power of the SCG is assigned based on the power of the MCG, except an overlapped portion of subframes within the MCG.

2. The method of claim 1, wherein the MCG is a group of serving cells associated with a master evolved NodeB (MeNB) in dual connectivity and includes a primary cell (PCell).

3. The method of claim 1, wherein the SCG is a group of serving cells associated with a secondary eNodeB (SeNB) in dual connectivity and includes a primary secondary cell (PSCell).

4. The method of claim 1, further comprising: comprising applying a priority based on a type of uplink control information (UCI) for a remaining power which is not assigned per CG.

5. The method of claim 4, wherein a priority of a physical random access channel (PRACH) is higher than a priority of a physical uplink control channel (PUCCH) or a physical uplink shared channel (PUSCH).

6. The method of claim 4, wherein a priority of a preceding subframe is higher than a priority of a following subframe.

7. The method of claim 1, further comprising:
    performing a power scaling on the assigned power per CG.

8. The method of claim 1, wherein two or more timing advance groups (TAGs) are configured per CG.

9. A user equipment (UE) comprising:
    a memory;
    a transceiver; and
    a processor coupled to the memory and the transceiver, and configured to:
        control the transceiver to receive a configuration for a power per cell group (CG) from a network, and
        assign the power per CG based on the received configuration,
    wherein at least one of a master cell group (MCG) or a secondary cell group (SCG) in dual connectivity is configured with at least one timing advance (TA), and
    wherein the power of the SCG is assigned based on the power of the MCG, except an overlapped portion of subframes within the MCG.

10. The UE of claim 9, wherein the MCG is a group of serving cells associated with a master evolved NodeB (MeNB) in dual connectivity and includes a primary cell (PCell).

11. The UE of claim 9, wherein the SCG is a group of serving cells associated with a secondary eNodeB (SeNB) in dual connectivity and includes a primary secondary cell (PSCell).

* * * * *